_United States Patent Office_ 3,725,272
Patented Apr. 3, 1973

3,725,272
FLAMEPROOFING AGENT FOR TEXTILE MATERIALS
Harro Petersen, Frankenthal, Friedrich Fuchs, Ludwigshafen, and Wilhelm Ruemens, Limburgerhof, Germany, assignors to Badische Anilin- & Soda-Fabrik Aktiengesellschaft, Ludwigshafen (Rhine), Germany
No Drawing. Filed July 21, 1970, Ser. No. 56,963
Int. Cl. C09k 3/28
U.S. Cl. 252—8.1          7 Claims

ABSTRACT OF THE DISCLOSURE

A novel flameproofing agent for textile materials containing as active ingredients a carbamoyl alkane phosphonic acid dialkyl ester free from N-hydroxymethyl and N-alkoxymethyl groups and an N-hydroxymethyl compound of an amino-s-triazine which may be non-etherified or partly or completely etherified at the N-hydroxymethyl groups.

---

This invention relates to novel compositions comprising certain carbamoyl phosphonic acid dialkyl esters and partially or completely etherified or non-etherified N-hydroxymethyl compounds of amino-s-triazines; the invention also relates to the use of such compositions as flameproofing agents for textile materials.

Belgian Pat. No. 647,376 discloses N-monomethylol and N-monoalkoxymethyl compounds of carbamoyl alkane phosphonic acid dialkyl esters and Swiss published application No. 5,131/67 discloses N-dimethylol and N-dialkoxymethyl compounds of the said esters. In the cited specifications the said compounds are recommended for use as flameproofing agents for cellulose. It has been found, however, that the N-methylol groups do not react quantitatively with the fibers, resulting in poor utilization of the cross-linking agent.

It is an object of the invention to provide novel flameproofing agents based on carbamoyl alkane phosphonic acid dialkyl esters having improved reactivity with the fiber.

This and other objects and advantages are achieved by the present invention.

We have found that very good flameproofing effects which are durable to laundering may be obtained on textile materials by using as flameproofing agents carbamoyl phosphoric acid dialkyl esters of the general formula:

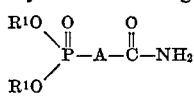

I in which each of $R^1$ stands for an alkyl radical of from 1 to 3 carbon atoms, optionally substituted by halogen, or both of $R^1$ together form an alkylene radical of from 2 or 3 carbon atoms and in which A stands for an unsubstituted or substituted alkylene radical of from 1 to 3, preferably of 2 or 3, carbon atoms, in admixture with N-hydroxymethyl and/or N-alkoxymethyl compounds of amino-s-triazines.

Due to their ready availability, those substances of Formula I are particularly suitable in which the radicals $R^1$ are unsubstituted or are substituted by fluorine, chlorine or bromine, alkyl radicals which are unsubstituted or which are substituted by bromine being preferred further preferred substances being those in which A is substituted by halogen and more particularly by chlorine or bromine, or by hydroxyl or, preferably, in which A is unsubstituted. Particularly valuable are those substances of Formula I in which A stands for an ethylene radical.

Examples of substances of Formula I are 2-carbamoyl ethane dimethyl phosphonate (II), 2-carbamoyl ethane diethyl phosphonate (III), 2-carbamoyl propane dimethyl phosphonate (IV), 2 - carbamoyl - 2 - hydroxyethane dimethyl phosphonate (V), carbamoyl methane di-(tribromoethyl)-phosphonate (VI) and 2-oxo-carbamoylethyl-1,3-dioxa-2-phospholane (VII).

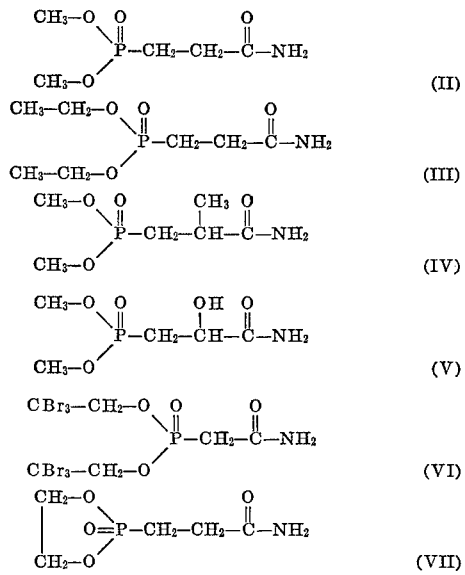

As examples of suitable amino-s-triazines, the N-hydroxymethyl and N-alkoxymethyl compounds of which may be used in the present invention, there may be mentioned ammeline, ammelide, guanamine and, above all, melamine. In these compounds, which are referred to below as the triazine components for short, the hydrogen atoms attached to nitrogen in the amino-s-triazine moiety are completely or partially replaced by hydroxymethyl groups, which latter may in turn be partially or completely etherified to alkoxymethyl groups, for example alkoxymethyl groups of from 1 to 4 carbon atoms, in particular methoxymethyl groups. The triazine components preferably contain at least two N-hydroxymethyl and/or N-alkoxymethyl groups. Examples of triazine components are: dimethylol-guanamine, tetramethoxymethyl-guanamine, trimethylol-melamine, hexamethylol-melamine, trimethoxymethyl-melamine, pentamethoxymethyl-melamine, trimethylol - trimethoxymethyl - melamine and hexaethoxymethyl-melamine.

The substances of Formula I may be used in conjunction with the triazine components with excellent success as flameproofing agents for textile materials and more particularly for textile materials containing or composed of natural or regenerated cellulose. In addition to providing excellent flame protection they also give rise to a highly desirable increase in the crease recovery angle when applied to cellulosic textile materials. The textile material to be treated is impregnated in the usual manner with one or more substances of Formula I and one or more triazine components and is then reacted with the substances applied thereto in the presence of at least one acid catalyst and/or potentially acid catalyst. The substances of Formula I and the triazine components are preferably used in the form of aqueous impregnation baths. In these baths the concentration of the substances of Formula I is generally in the range 100 g./l. to 500 g./l., and that of the triazine components in the range 50 g./l. to 250 g./l. When preparing the baths it is particularly convenient to use preformed mixtures of the substances of Formula I with triazine components, the ratio of these ingredients in the mixtures being, to give the above concentrations, from 100 to 500 parts of substance of Formula I to from 50 to 250 parts of triazine component, by weight. In such mixtures the most suitable triazine components are the N-alkoxymethyl compounds, since these show particularly good stability in the presence of substances of Formula I.

Impregnation is preferably carried out on a padding machine. Excess liquid is squeezed out of the impregnated material; fibrous material may be dried and then heated to a temperature of up to 200° C., preferably from 130° to 170° C., in the presence of acid and/or potentially acid catalysts. Under such conditions the reaction is generally complete after from 1 to 6 minutes.

Acid and potentially acid catalysts are well known and commonly used in textile finishing operations. Examples of suitable catalysts of this kind are inorganic and organic acids such as sulfuric acid, hydrochloric acid, phosphoric acid, boric acid, oxalic acid, and salts which react with an acid reaction or which from acids in use, for example due to the action of heat and/or due to hydrolysis, for example ammonium salts and amine salts, magnesium chloride, zinc chloride and zinc nitrate. Particularly good flameproofing effects are obtained by the use of mono- and di-ammonium phosphates. The reaction of the substanes of Formula I and the triazine components with the textile material is carried out, as mentioned above, in the presence of the said catalysts. This may be realized by applying the catalysts, preferably in the form of aqueous solutions, to the textile material before or after latter is impregnated with the said substances of Formula I and triazine components. However, we prefer to add the catalysts directly to the impregnation bath containing said substances and components. In general, success has been achieved with catalyst concentrations ranging from 10 to 40 g./l.

There may also be used, together with the substances of Formula I and triazine components, resin finishing agents of the kind hiterto, such as the nitrogen-containing hydroxymethyl or alkoxymethyl or alkoxymethyl compounds of urea, thiourea, cyclic ureas such as ethylene urea, propylene urea, glyoxal mono(imidazolid-2-one), triazinones and urones, mono- and di-carbamic acid esters, and also compounds such as poly(ethylene glycol formaldehydes) and compounds containing epoxy groups, such as glycol diglycidyl ethers. Conventional water repellents, leveling agents, wetting agents and finishing agents may also be used. The inclusion of softening agents has been successful in achieving a pleasant handle. Suitable softening agents are for example, the reaction products of triethanolamine or trioxyethyl-diethylene-triamine with stearic acid and optionally dimethyl sulfate. Other softening agents are, for example, oxyethylation products of high molecular weight fatty acid, fatty alcohols or fatty acid amides, high molecular weight poly(glycol ethers) and esters thereof, high molecular weight fatty acids, fatty alcohol sulfonates, stearyl-N,N-ethylene urea and stearyl-amidomethylpridinium chloride. Emulsified siloxanes may be used as brightening agents. Water-repellents are, for example, the well-known aluminum-containing or zirconium-containing paraffin wax emulsions and silicone-containing preparations, whilst perfluorinated aliphatic compounds are suitable oil repellents.

Examples of wetting agents are salts of alkyl naphthalene sulfonic acids, the alkali metal salts of sulfonated dioctyl succinate and the alkylene oxide addition products of fatty alcohols, alkyl phenyls, fatty amines and the like. Suitable finishing agents are, for example, cellulose ethers or esters and alginates, and also solutions or dispersions of polymers, particularly synthetic polymers such as polyethylene, polyamides, oxyethylated polyamides, polyvinyl ethers, polyvinyl alcohols, polyacrylic acid or esters or amides thereof, and also of corresponding polymethacrylic compounds, polyvinyl propionate, polyvinyl pyrrolidone, copolymers, for example copolymers of acrylic or methacrylic acid esters with at least 20% by weight of acrylic and/or methacrylic acids, copolymers of vinyl chloride with acrylic acid esters, copolymers of butadiene and styrene or acrylonitrile, copolymers of α-dichloroethylene, β-chloroalkyl acrylates or vinyl β-ethyl ether and acrylamide or the amides of crotonic or maleic acid, or copolymers of N-methylolmethacrylamide and other polymerizable compounds.

The textile material, following finishing with the substances of the general Formula I and the triazine components, exhibits excellent flameproofing effects which are highly durable to laundering.

In the following examples the parts and percentages are by weight. Parts by weight relate to parts by volume as the kilogram to the liter.

EXAMPLE 1

A twilled cotton fabric weighing about 170 g./m.$^2$ is padded with an aqueous liquor containing 240 g. of carbamoyl ethane dimethyl phosphonate, 110 g. of hexamethylol melamine pentamethyl ether and 18 g. of monoammonium phosphate per liter such that the uptake of liquor is approximately 100% of the weight of the fabric. The fabric is dried at about 100° C. and condensed for 5 minutes at 160° C. The liquor was obtained by dissolving a preformed mixture of 240 parts of carbamoyl ethane dimethyl phosphonate and 110 parts of hexamethylol melamine pentamethyl ether in water and adding monoammonium phosphate.

To remove small amounts of unreacted reactants the fabric is then washed for 1 minute at from 70° to 80° C. with a solution of 2 g./l. of soda in water.

The fabric is then rinsed and dried. The fabric thus finished shows a high degree of flame resistance which is retained after a number of washes at the boil.

The results of testing by German standard specification DIN 53,906 are as follows:

|  | Application | After— | | | |
|---|---|---|---|---|---|
|  |  | 10 boils[1] | 20 boils[1] | 30 boils[1] | 40 boils[1] |
| Testing period (seconds) | 6 | 6 | 6 | 6 | 6 |
| Burning time (seconds) | 0 | 0 | 0 | 0 | 0 |
| Glowing time (seconds) | 0 | 0 | 0 | 0 | 0 |
| Length of tear (mm.) | 86 | 69 | 74 | 70 | 74 |
| Load (grams) | 50 | 50 | 50 | 50 | 50 |

[1] Each boil comprises washing for 15 minutes at 95° C. with a commercial detergent at a concentration of 1.5 g./l.

EXAMPLE 2

175 parts of carbamoyl ethane dimethyl phosphonate and 160 parts of hexamethylol melamine pentamethyl ether, either separately or in the form of a preformed mixture, and 30 parts of a 30% aqueous emulsion of a 3:1 mixture of monomethyl siloxane and dimethylol siloxane together with 18 parts of monoammonium phosphate are diluted to a total of 1,000 parts by volume with water. This mixture is used to treat twilled cotton fabric on a padding machine such that the wet pickup is approximately 100% by weight. The fabric is dried at from 80° to 100° C. and the condensation then effected for 5 minutes at from 160° to 165° C. After a wet treatment (1 minute with 2 g./l. of soda at 70° C. followed by rinsing) the fabric is again dried. The finished textile material shows excellent flame retardance which is retained after a large number of washes at the boil without loss of effectiveness. The following results are achieved on testing by German standard specification DIN 53,906:

|  | Application | After— | | | |
|---|---|---|---|---|---|
|  |  | 10 boils[1] | 20 boils[1] | 30 boils[1] | 40 boils[1] |
| Testing period (seconds) | 6 | 6 | 6 | 6 | 6 |
| Burning time (seconds) | 0 | 0 | 0 | 0 | 0 |
| Glowing time (seconds) | 0 | 0 | 0 | 0 | 0 |
| Length of tear (mm.) | 83 | 75 | 83 | 71 | 68 |
| Load (grams) | 50 | 50 | 50 | 50 | 50 |

[1] Under the same conditions as used in Example 1.

EXAMPLE 3

A twilled cotton fabric weighing 170 g./m.² is treated on a padding machine with an aqueous liquor containing 290 g. of carbamoyl ethane diisopropyl phosphonate and 110 g. of hexamethylol melamine pentamethyl ether, dissolved either separately or in the form of a preformed mixture, and 20 g. of monoammonium phosphate per liter such that the wet pickup is about 100% by weight. The fabric is then dried for 6 minutes at from 90° to 100° C. and condensed for 5 minutes at 160° C. The fabric is then washed for 1 minute at 70° C. with a solution containing 2 g. of soda per liter of water. After rinsing and drying, the fabric shows high flame resistance which is retained after a number of washes at the boil. The results of testing by German standard specification DIN 53,906 are as follows:

|  | Application | After— | | | |
|---|---|---|---|---|---|
|  |  | 10 boils[1] | 20 boils[1] | 30 boils[1] | 40 boils[1] |
| Testing period (seconds) | 6 | 6 | 6 | 6 | 6 |
| Burning time (seconds) | 0 | 0 | 0 | 0 | 0 |
| Glowing time (seconds) | 0 | 0 | 0 | 0 | 0 |
| Length of tear (mm.) | 86 | 69 | 74 | 70 | 74 |
| Load (grams) | 50 | 50 | 50 | 50 | 50 |

[1] Under the same conditions as used in Example 1.

EXAMPLE 4

A mixture of 300 parts of carbamoyl ethane di(tribromoethyl) phosphonate and 90 parts of trimethylol melamine, or the same quantities of these ingredients separately, together with 25 parts of monoammonium phosphate are diluted with water to a total of 100 parts by volume. This solution is used to treat a twilled cotton fabric on a padding machine such that the wet pickup is approximately 100% by weight. The fabric is then dried for 5 minutes at 160° C., washed for 1 minute at 70° C. with an aqueous solution of 2 g./l. of soda, rinsed and dried. The following results are obtained on testing by German standard specification DIN 53,906:

|  | Application | After— | | | |
|---|---|---|---|---|---|
|  |  | 10 boils[1] | 20 boils[1] | 30 boils[1] | 40 boils[1] |
| Testing period (seconds) | 6 | 6 | 6 | 6 | 6 |
| Burning time (seconds) | 0 | 0 | 0 | 0 | 0 |
| Glowing time (seconds) | 0 | 0 | 0 | 0 | 0 |
| Length of tear (mm.) | 86 | 69 | 74 | 70 | 74 |
| Load (grams) | 50 | 50 | 50 | 50 | 50 |

[1] Under the same conditions as used in Example 1.

EXAMPLE 5

330 parts of 2-carbamoyl propane dimethyl phosphonate and 100 parts of hexamethylol melamine pentamethyl ether or a preformed mixture thereof and 20 parts of monoammonium phosphate are diluted with water to a total volume of 1,000 parts by volume. This solution is used to treat a twilled cotton fabric on a padding machine such that the wet pickup is approximately 100% by weight.

The fabric is dried at 100° C. and then condensed for 5 minutes at 160° C.

The fabric is washed for 2 minutes at 70° C. with an aqueous solution of 2 g./l. of soda, rinsed and dried.

The results of testing by German standard specification DIN 53,906 are as follows:

|  | Application | After— | | | |
|---|---|---|---|---|---|
|  |  | 10 boils[1] | 20 boils[1] | 30 boils[1] | 40 boils |
| Testing period (seconds) | 6 | 6 | 6 | 6 | 6 |
| Burning time (seconds) | 0 | 0 | 0 | 0 | 0 |
| Glowing time (seconds) | 0 | 0 | 0 | 0 | 0 |
| Length of tear (mm.) | 86 | 69 | 74 | 70 | 74 |
| Load (grams) | 50 | 50 | 50 | 50 | 50 |

[1] Under the same conditions as used in Example 1.

EXAMPLE 6

A twilled cotton fabric weighing 168 g./m.² is padded with an aqueous liquor containing 250 g. of carbamoyl ethane diethyl phosphonate, 100 g. of hexamethylol melamine pentamethyl ether and 20 g. of monoammonium phosphate per liter so that a wet pickup of approximately 100% by weight results. The fabric is dried at from 90° to 100° C. and condensed for 5 minutes at 160° C. It is then washed for 2 minutes in an aqueous solution of 2 g./l. of soda at 70° C. After rinsing and drying, the fabric shows a high degree of flame resistance which is retained after a large number of washes at the boil. The results of testing by German standard specification DIN 53,906 are as follows:

|  | Application | After— | | |
|---|---|---|---|---|
|  |  | The soda wash | 30 boils[1] | 50 boils[1] |
| Testing period (seconds) | 6 | 6 | 6 | 6 |
| Burning time (seconds) | 0 | 0 | 0 | 0 |
| Glowing time (seconds) | 0 | 0 | 0 | 1 |
| Length of tear (mm.) | 95 | 98 | 100 | 100 |
| Load (grams) | 50 | 50 | 50 | 50 |

[1] Using the same conditions as in Example 1.

We claim:

1. A flameproofing agent for extile materials essentially comprising
   (a) from 100 to 500 parts by weight of at least one substance of the general formula

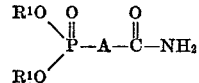

in which each of $R^1$ stands for alkyl of from 1 to 3 carbon atoms or haloalkyl of from 1 to 3 carbon atoms and A stands for alkylene of from 1 to 3 carbon atoms, and
   (b) from 50 to 250 parts by weight of at least one amino-s-triazine in which some or all of the hydrogen atoms attached to nitrogen are substituted by a radical selected from the group consisting of N-hydroxymethyl and N-alkoxymethyl having from 1 to 4 carbon atoms in the alkoxy moiety.

2. A flameproofing agent as claimed in claim 1 wherein component
   (a) is 2-carbamoyl ethane dimethyl phosphonate and component
   (b) is a melamine substituted by at least two radicals selected from the group consisting of N-hydroxymethyl radicals and N-alkoxymethyl radicals having from 1 to 4 carbon atoms in the alkoxy moiety.

3. A flameproofing agent as claimed in claim 1 wherein component (b) is hexamethylol melamine pentamethyl ether.

4. A flameproofing agent as claimed in claim 1 wherein component (a) is 2-carbamoyl ethane di(tribromoethyl) phosphonate.

5. A flameproofing agent as claimed in claim 1 wherein component (a) is 2-carbamoyl propane dimethyl phosphonate.

6. A flameproofing agent as claimed in claim 1 wherein component (a) is 2-carbamoyl ethane diethyl phosphonate.

7. A flameproofing agent as claimed in claim 1 wherein component (b) is trimethylol melamine.

References Cited
UNITED STATES PATENTS

| | | | |
|---|---|---|---|
| 3,374,292 | 3/1968 | Zahir | 260—943 |
| 2,754,319 | 7/1956 | Johnston | 260—940 X |
| 2,754,320 | 7/1956 | Johnston | 260—940 X |

DANIEL J. FRITSCH, Primary Examiner

U.S. Cl. X.R.

8—116 P, 116.2; 117—136